(12) United States Patent
Yang et al.

(10) Patent No.: US 10,317,617 B2
(45) Date of Patent: Jun. 11, 2019

(54) DISPLAY DEVICE AND METHOD FOR PREPARING THE SAME

(71) Applicant: InnoLux Corporation, Miao-Li County (TW)

(72) Inventors: Chih-Chiao Yang, Miao-Li County (TW); Chia-Chun Yang, Miao-Li County (TW); Chin-Cheng Kuo, Miao-Li County (TW); Jia-Sin Li, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 5 days.

(21) Appl. No.: 15/817,351

(22) Filed: Nov. 20, 2017

(65) Prior Publication Data
US 2018/0149808 A1     May 31, 2018

(30) Foreign Application Priority Data

Nov. 29, 2016   (CN) ........................ 2016 1 1070028

(51) Int. Cl.
*F21V 8/00*        (2006.01)

(52) U.S. Cl.
CPC ........... *G02B 6/0088* (2013.01); *G02B 6/009* (2013.01); *G02B 6/0065* (2013.01); *G02B 6/0055* (2013.01); *G02B 6/0083* (2013.01)

(58) Field of Classification Search
None
See application file for complete search history.

(56) References Cited

U.S. PATENT DOCUMENTS

| 2007/0172648 A1* | 7/2007 | Harai | ........................ C09J 7/29 428/343 |
| 2015/0346478 A1* | 12/2015 | Kim | ..................... G02B 26/001 359/291 |
| 2016/0116658 A1* | 4/2016 | Chen | ..................... G02B 6/002 362/611 |

* cited by examiner

*Primary Examiner* — Kristy A Haupt
(74) *Attorney, Agent, or Firm* — Bacon & Thomas, PLLC

(57) ABSTRACT

A display device and a method for preparing the same are disclosed. The display device includes a display panel and a backlight module. The backlight module is located below the display panel and includes a back plate, a first adhesive layer, a light emitting module and a reflector. The first adhesive layer is disposed on the back plate and the first adhesive layer includes a first area and a second area. The first area is adjacent to the second area. The light emitting module includes a light emitting unit and a print circuit board. The light emitting unit and the print circuit board are electrically connected, and the print circuit board is disposed in the first area of the first adhesive layer. A part of the reflector is disposed in the second area of the first adhesive layer.

16 Claims, 12 Drawing Sheets

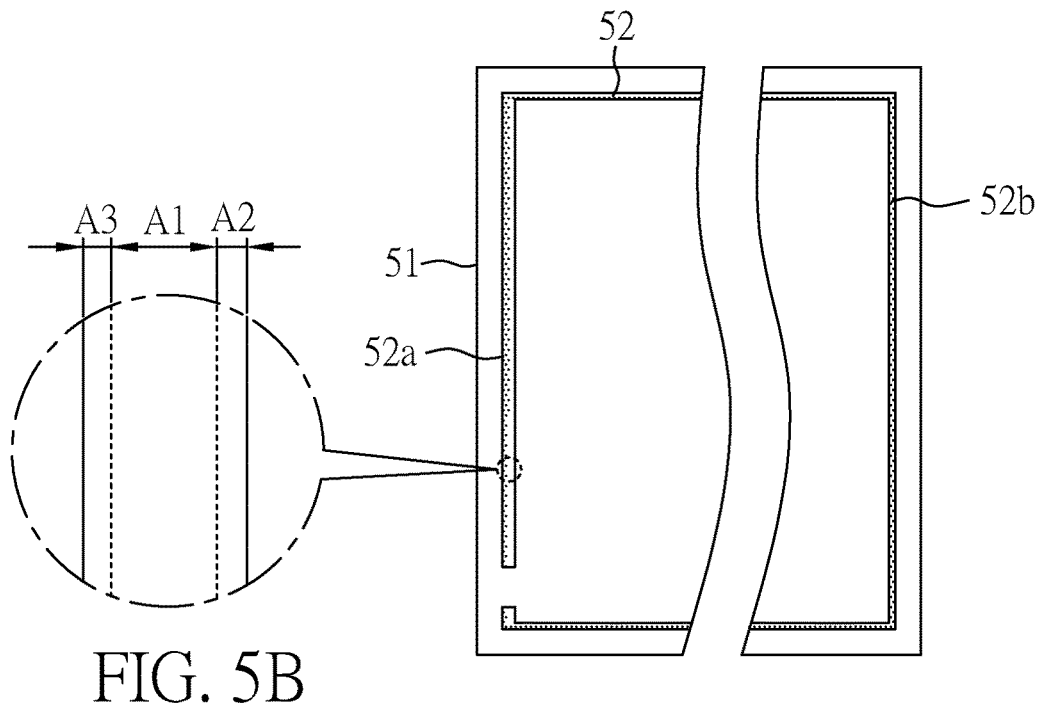
FIG. 5B
FIG. 5A
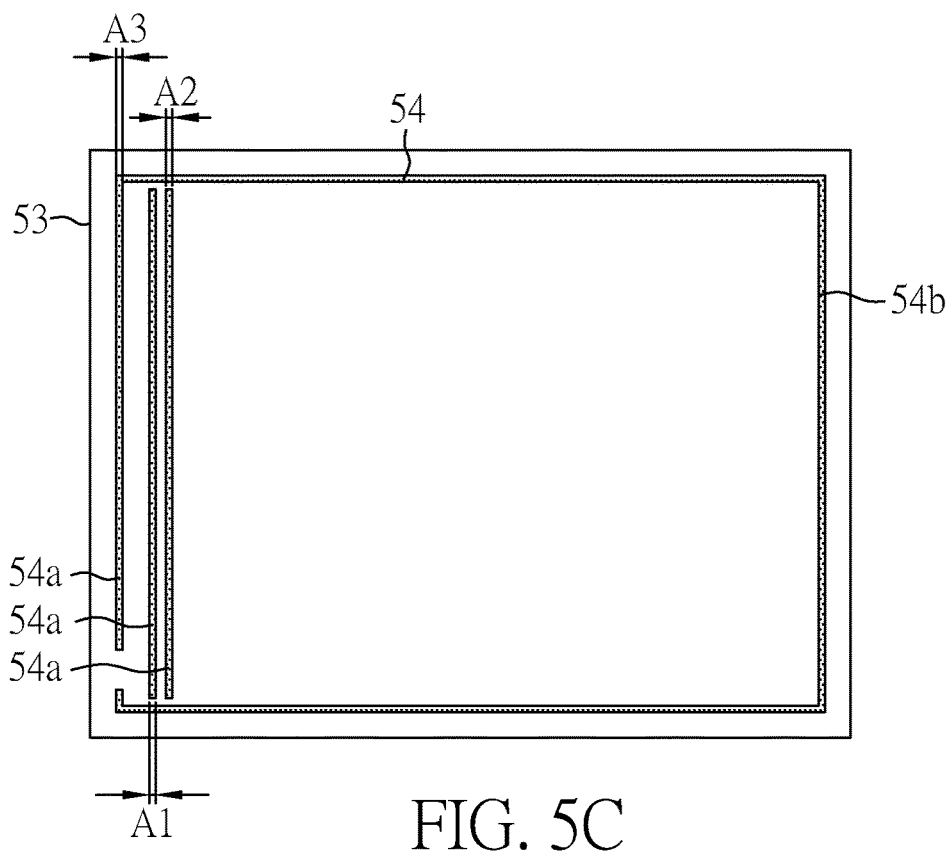
FIG. 5C

DISPLAY DEVICE AND METHOD FOR PREPARING THE SAME

CROSS REFERENCE TO RELATED APPLICATION

This application claims the benefits of the Chinese Patent Application Serial Number 201611070028.8, filed on Nov. 29, 2016, the subject matter of which is incorporated herein by reference.

BACKGROUND

1. Field

The present disclosure relates to a display device and a method for preparing the same, and more particularly to a display device with improved attachment of its backlight module using a patterned adhesive layer, and a method for preparing the same.

2. Description of Related Art

Our daily life has been filled up with various electronic devices. Therein, with increasing technical progress, display devices are more and more made toward compactness, thinness and lightness. As a result, thin display devices such as liquid crystal display devices and LED display devices have almost replaced cathode-ray-tube display devices, and as the dominant products. Device with thin display is extensively applicable in our daily life and can be seen around us in, for example, watches, mobile phones, laptop computers, video cameras, still cameras, music players, mobile navigators, TV sets, etc.

Currently, components in a display device are usually affixed by using adhesive tapes. However, adhesive tape has some problems since its nature against the requirements for automated production of backlight modules and for narrow bezels. These problems can be illustrated below. First, it is difficult to cut adhesive tape into pieces narrower than 0.5 mm. Secondary, when cut into an O-like shape, such adhesive tape can have poor attachment yield. For these reasons, adhesive tape is unfavorable to automated production of backlight modules.

Hence, there is a need for a display device having improved attachment of its backlight module and suitable for automated production of the backlight module.

SUMMARY

The primary objective of the present disclosure is to solve the foregoing problem by providing a display device with improved attachment of its backlight module and a preparing method of the display device described above.

To achieve the foregoing objective, the disclosed display device comprises: a display panel and a backlight module. The backlight module is disposed adjacent to the display panel, and the backlight module comprises a back plate, a first adhesive layer, a light emitting module and a reflector. The first adhesive layer is disposed on the back plate, and has a first area and a second area adjacent to the first area. The light emitting module is disposed on the first adhesive layer, and comprises a light emitting unit and a print circuit board. The light emitting unit is electrically connected to the print circuit board, and the print circuit board is disposed in the first area of the first adhesive layer. The reflector is disposed adjacent to the print circuit board of the light emitting module, and a part of the reflector is disposed in the second area of the first adhesive layer.

A preparing method for preparing the disclosed display device comprises the following steps: (A) providing a back plate, and applying a first adhesive layer on the back plate, wherein the first adhesive layer is disposed on the back plate, and the first adhesive layer has a first area and a second area adjacent to the first area; (B) disposing an light emitting module on the back plate, wherein the light emitting module comprises a light emitting unit and a print circuit board, the light emitting unit is electrically connected to the print circuit board, and the print circuit board is disposed in the first area of the first adhesive layer; (C) disposing a reflector on the back plate so as to obtain a backlight module, wherein the reflector is disposed adjacent to the print circuit board of the light emitting module, and a part of the reflector is disposed in the second area of the first adhesive layer; and (D) placing a display panel on the backlight module so as to obtain the display device.

The disclosure as well as a mode of use, further objectives and advantages thereof will be best understood by reference to the following detailed description of illustrative embodiments when read in conjunction with the accompanying drawings.

BRIEF DESCRIPTION OF THE DRAWINGS

FIG. 5A shows a pattern of the patterned adhesive layer of the disclosed display device.

FIG. 5B is a close-up view of FIG. 5A.

FIG. 5C shows another pattern of the patterned adhesive layer of the disclosed display device.

DETAILED DESCRIPTION OF EMBODIMENT

The following embodiments when read with the accompanying drawings are made to clearly exhibit the above-mentioned and other technical contents, features and effects of the present disclosure. Through the exposition by means of the specific embodiments, people would further understand the technical means and effects the present disclosure adopts to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

Furthermore, the ordinals recited in the specification and the claims such as "above", "over", or "on" are intended not only directly contact with the other substrate or film, but also intended indirectly contact with the other substrate or film.

Embodiment 1

Figure 1A:
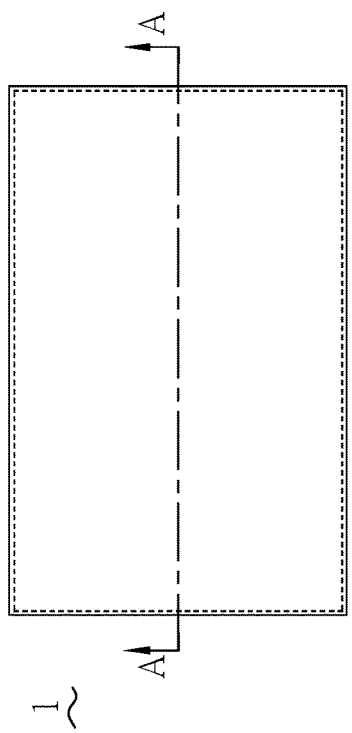
FIG. 1A is a schematic top view of a display device according to Embodiment 1 of the present disclosure.
Figure 1B:
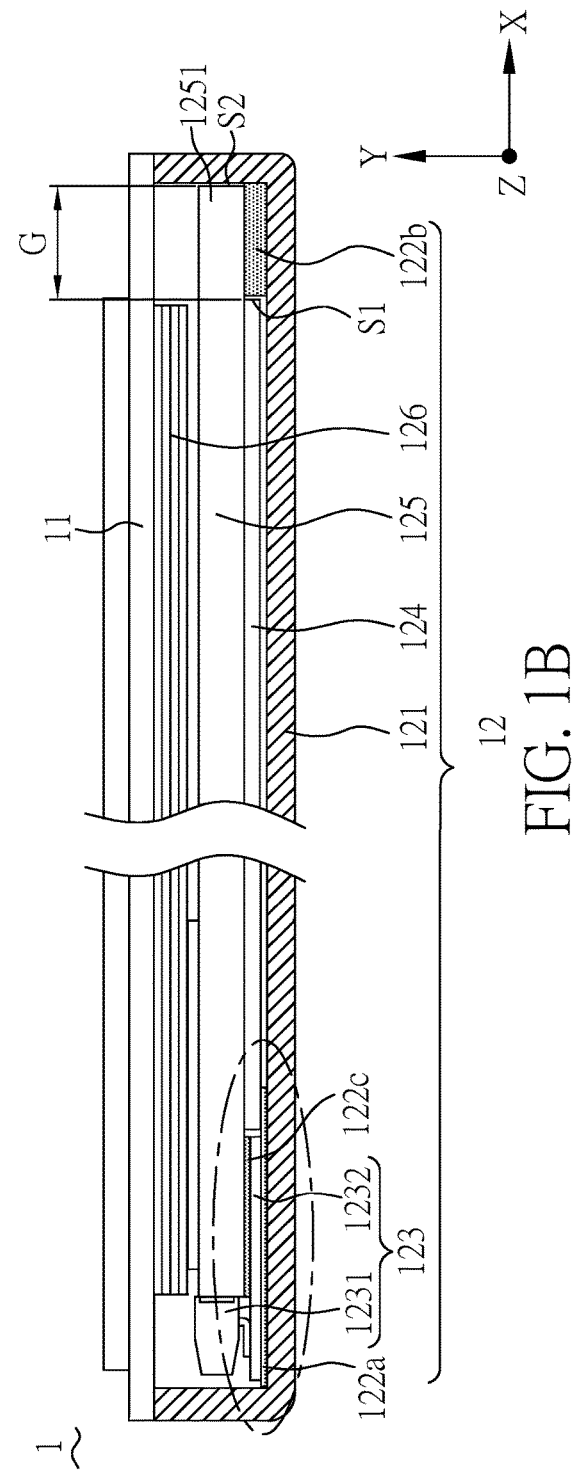
FIG. 1B is a schematic cross-sectional view of the display device taken along Line A-A of FIG. 1A.
Figure 1C:
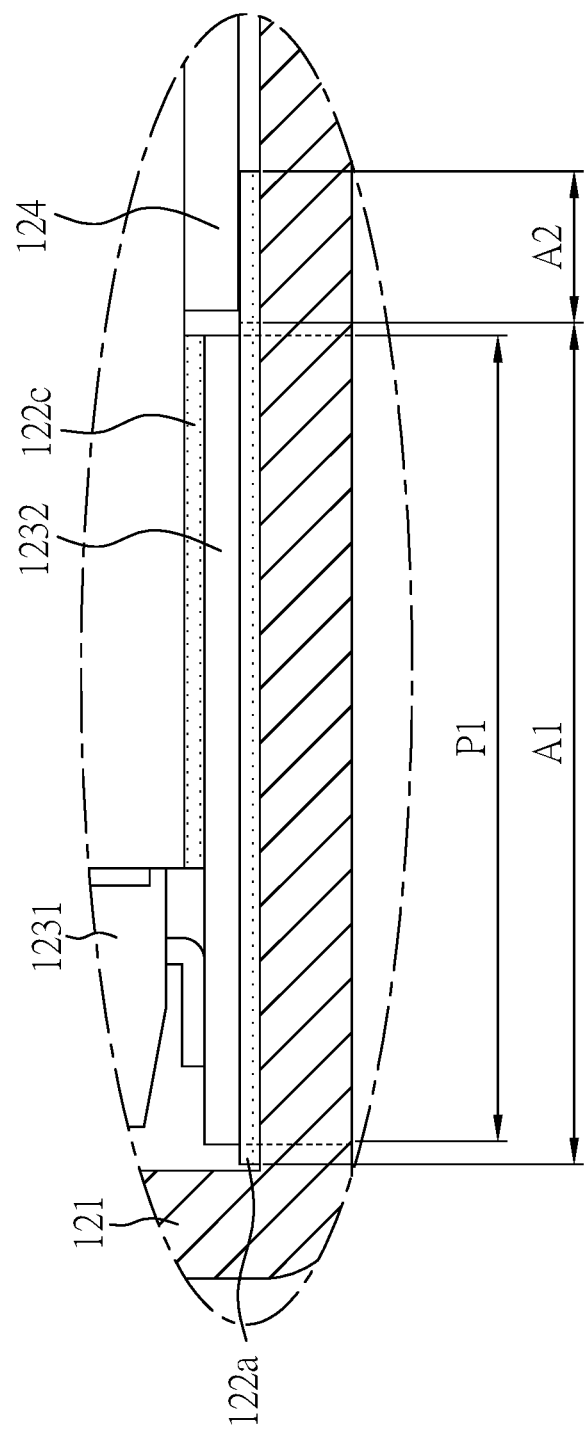
FIG. 1C is a close-up view of FIG. 1B.

Referring to FIG. 1A, FIG. 1B, and FIG. 1C, a schematic top view, a schematic cross-sectional view, and a close-up view of a display device according to Embodiment 1 of the present disclosure are shown.

In Embodiment 1 of the present disclosure, the display device 1 comprises a display panel 11 and a backlight module 12. The display panel 11 is disposed on the backlight module 12, and the backlight module 12 comprises a back plate 121, a first adhesive layer 122a, a second adhesive layer 122b, a third adhesive layer 122c, a light emitting module 123, a reflector 124, a light guide plate 125, and an optical film set 126.

The back plate 121 comprises a first peripheral zone P1. The first adhesive layer 122a is disposed on the back plate 121, and comprises a first area A1 and a second area A2. The first area A1 is adjacent to the second area A2, and the first peripheral zone P1 is disposed in a part of the first area A1. The light emitting module 123 is disposed in a first peripheral zone P1. The light emitting module 123 comprises a light emitting unit 1231 and a print circuit board 1232. The light emitting unit 1231 is electrically connected to the print circuit board 1232, and the print circuit board 1232 is disposed in the first area A1 of the first adhesive layer 122a. The reflector 124 is disposed adjacent to the print circuit board 1232 of the light emitting module 123, and a part of the reflector 124 is disposed in the second area A2 of the first adhesive layer 122a. The light guide plate 125 and the optical film set 126 are successively stacked on the reflector 124.

In Embodiment 1, the second adhesive layer 122b is located around the back plate 121, the reflector 124, and the light guide plate 125. In particular, the reflector 124 comprises a first side S1. The first side S1 is the side of the reflector 124 that is farthest from the first peripheral zone P1. The light guide plate 125 is jutting out of the first side S1 of the reflector 124 in a first direction X. The light guide plate 125 comprises a protruding part 1251 and a second side S2. The protruding part 1251 is a part of the light guide plate 125 that is jutting out of the first side S1 of the reflector 124. The second adhesive layer 122b is located below the protruding part 1251. The second side S2 is a side of the light guide plate 125 that is farthest from the first peripheral zone P1. In the first direction X, a gap G between the first side S1 and the second side S2 is greater than or equal to 0.1 mm and less than or equal to 0.5 mm.

In other words, the reflector 124 and the light guide plate 125 has the gap G in their length direction (parallel to Line A-A), so that the second adhesive layer 122b is disposed on the back plate 121 around the back plate 121, the reflector 124, and the light guide plate 125. Despite the configuration shown, in the backlight module 12, the structural feature formed by the first side S1 of the reflector 124, the second side S2 of the light guide plate 125, and the protruding part 1251 may be realized on other sides, and the present disclosure is not limited to the present embodiment.

In the present disclosure, the first adhesive layer 122a, the second adhesive layer 122b, and the third adhesive layer 122c may comprise one of hot melt adhesive and ultraviolet-pressure sensitive adhesive (UV-PSA), without limitation. The hot melt adhesive contains plural buffering particles, for maintaining the hot melt adhesive a certain post-press height. The ultraviolet-pressure sensitive adhesive has high transparency and high adhesion force, and is suitable for large-area application. After application, the ultraviolet-pressure sensitive adhesive is cured by ultraviolet, and pressing is performed thereon for binding.

Embodiment 2

Figure 2A:
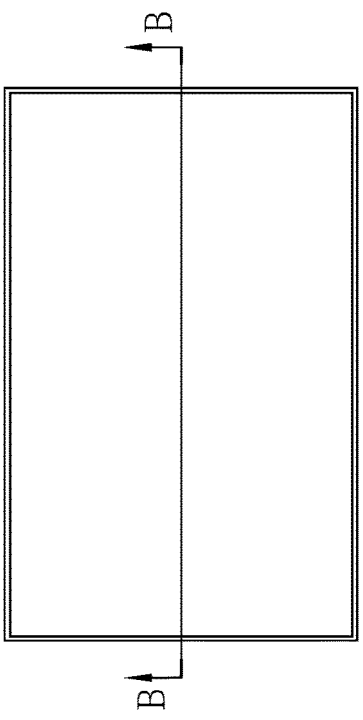
FIG. 2A is a schematic top view of a display device according to Embodiment 2 of the present disclosure.
Figure 2B:
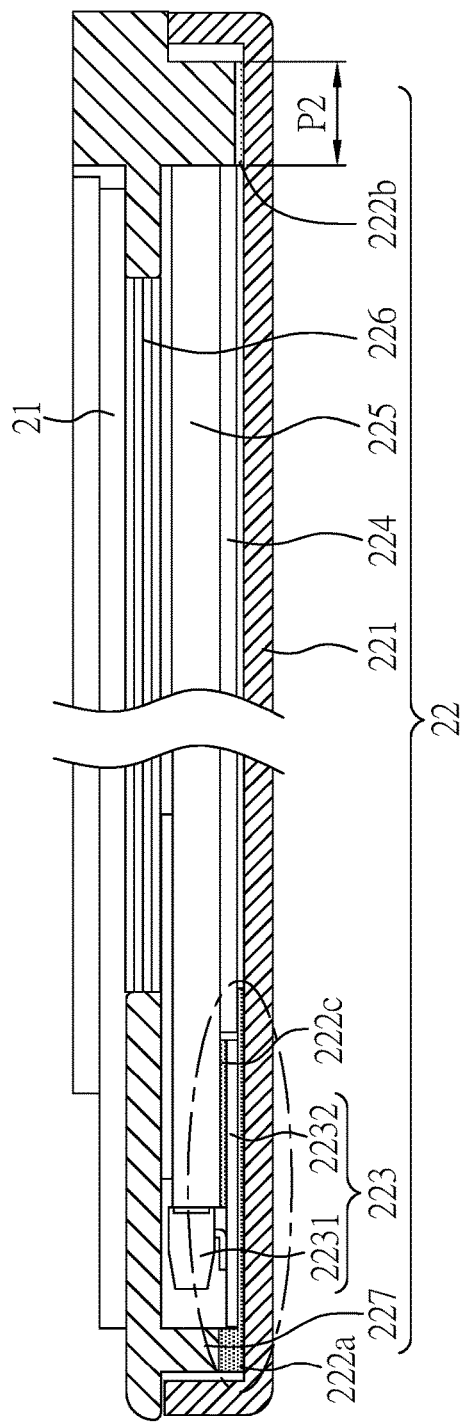
FIG. 2B is a schematic cross-sectional view of the display device taken along Line B-B of FIG. 2A.
Figure 2C:
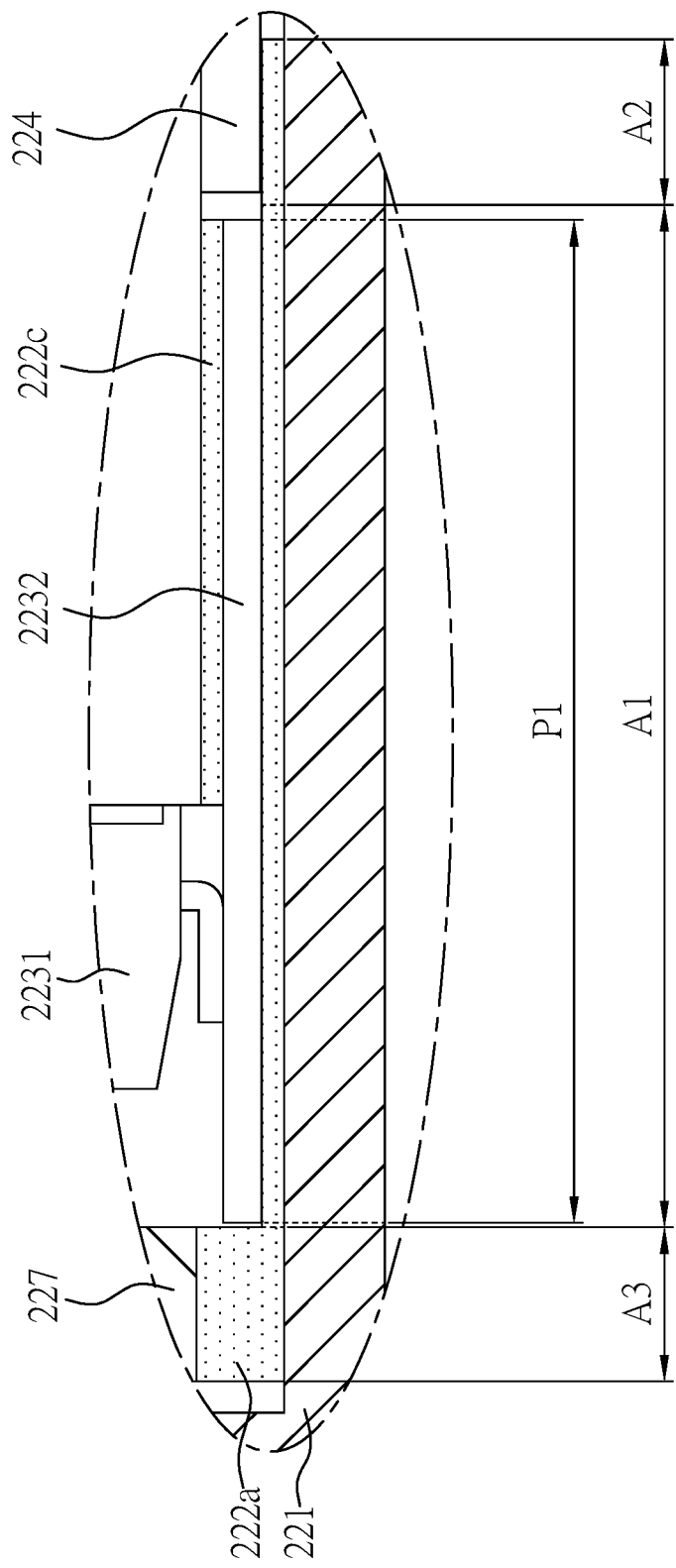
FIG. 2C is a close-up view of FIG. 2B.

Referring to FIG. 2A, FIG. 2B, and FIG. 2C, a schematic top view, a schematic cross-sectional view, and a close-up view of a display device according to Embodiment 2 of the present disclosure are shown.

In Embodiment 2 of the present disclosure, the display device 2 comprises a display panel 21 and a backlight module 22. The display panel 21 is disposed on the backlight module 22. The backlight module 22 comprises a back plate 221, a first adhesive layer 222a, a second adhesive layer 222b, a third adhesive layer 222c, a light emitting module 223, a reflector 224, a light guide plate 225, an optical film set 226, and a frame 227.

The back plate 221 comprises a first peripheral zone P1 and a second peripheral zone P2. The first peripheral zone P1 and the second peripheral zone P2 are located at two opposite sides of the back plate 221, respectively. The first adhesive layer 222a is disposed on the back plate 221, and comprises a first area A1, a second area A2, and a third area A3. Therein, the first area A1 is adjacent to the second area A2, and the first peripheral zone P1 overlaps a part of the first area A1. The first area A1 is located between the second area A2 and the third area A3. The second adhesive layer 222b is disposed in the second peripheral zone P2. The light emitting module 223 is disposed in the first peripheral zone P1. The light emitting module 223 comprises a light emitting unit 2231 and a print circuit board 2232. The light emitting unit 2231 is electrically connected to the print circuit board 2232. The print circuit board 2232 is disposed in the first area A1 of the first adhesive layer 222a. The reflector 224 is adjacent to the print circuit board 2232 of the light emitting module 223, and a part of the reflector 224 is disposed in the second area A2 of the first adhesive layer 222a. The light guide plate 225 and the optical film set 226 are successively stacked on the reflector 224.

The difference between Embodiment 1 and Embodiment 2 relies on the structure and the binding site of the backlight module 22. In Embodiment 2, the backlight module 22 further comprises the frame 227. A part of the frame 227 is bound to the back plate 221 through the third area A3 of the first adhesive layer 222a, and the other part of the frame 227 is bound to the back plate 221 at the second peripheral zone P2 through the second adhesive layer 222b. In the present disclosure, the frame 227 is a resin frame.

Embodiment 3

Figure 3A:
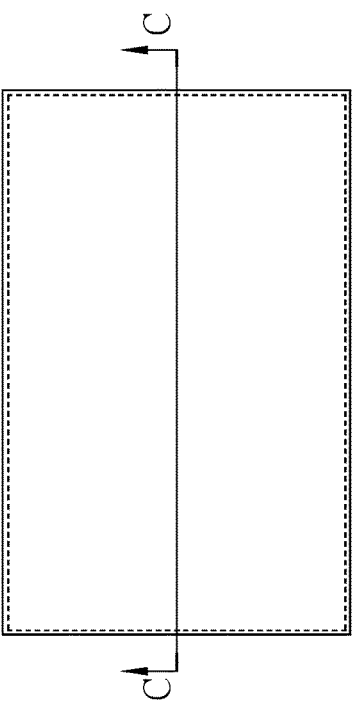
FIG. 3A is a schematic top view of a display device according to Embodiment 3 of the present disclosure.
Figure 3B:
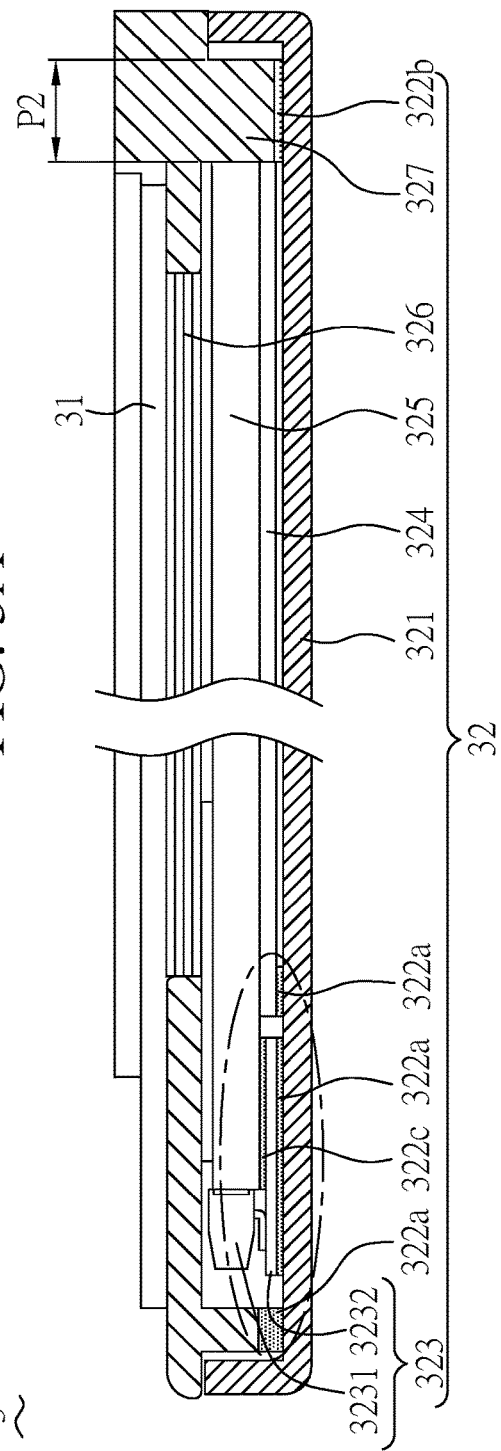
FIG. 3B is a schematic cross-sectional view of the display device taken along Line C-C of FIG. 3A.
Figure 3C:
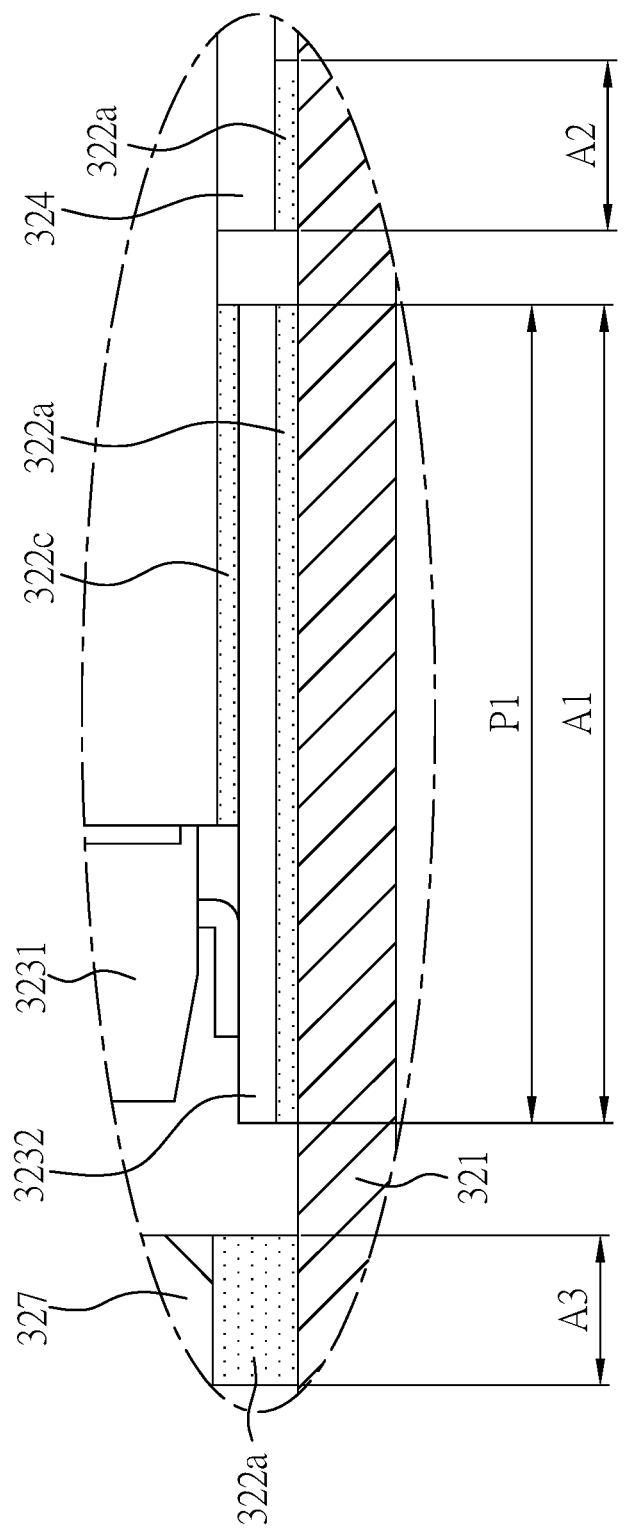
FIG. 3C is a close-up view of FIG. 3B.

Referring to FIG. 3A, FIG. 3B, and FIG. 3C, a schematic top view, a schematic cross-sectional view, and a close-up view of a display device according to Embodiment 3 of the present disclosure are shown.

In Embodiment 3 of the present disclosure, the display device 3 comprises a display panel 31 and a backlight module 32. The display panel 31 is disposed on the backlight module 32, and the backlight module 32 comprises a back plate 321, a first adhesive layer 322a, a second adhesive layer 322b, a third adhesive layer 322c, an light emitting module 323, a reflector 324, a light guide plate 325, an optical film set 326, and a frame 327.

The back plate 321 comprises a first peripheral zone P1 and a second peripheral zone P2. The first peripheral zone P1 and the second peripheral zone P2 are located at two opposite sides of the back plate 321, respectively. The first adhesive layer 322a is disposed on the back plate 321, and comprises a first area A1, a second area A2, and a third area A3. The first area A1 is adjacent to the second area A2, and the first peripheral zone P1 overlaps a part of the first area A1. The first area A1 is located between the second area A2 and the third area A3. The second adhesive layer 322b is disposed in the second peripheral zone P2. The light emitting module 323 is disposed in the first peripheral zone P1. The light emitting module 323 comprises a light emitting unit 3231 and a print circuit board 3232. The light emitting unit 3231 is electrically connected to the print circuit board 3232, and the print circuit board 3232 is disposed in the first area A1. of the first adhesive layer 322a. The reflector 324 is adjacent to the print circuit board 3232 of the light emitting module 323, and a part of the reflector 324 is disposed in the second area A2 of the first adhesive layer 322a. The light guide plate 325 and the optical film set 326 are successively stacked on the reflector 324. A part of the frame 327 is disposed in the third area A3 of the first adhesive layer 322a, and the other part of the frame 327 is disposed on the second adhesive layer 322b.

Embodiment 3 is a variation of Embodiment 2, and the difference therebetween relies on how the first adhesive layer 322a is configured. In Embodiment 2, the first adhesive layer 222a located in the first area A1, the second area A2, and the third area A3 are formed continuously and it binds the frame 227, the print circuit board 2232, and a part of the reflector 224 together. In Embodiment 3, the first adhesive layer 322a located in the first area A1, the second area A2, and the third area A3 are formed separately. The separately formed first adhesive layer 322a positionally corresponds to and binds the frame 327, the print circuit board 3232, and the part of the reflector 324 in the first area A1, the second area A2, and the third area A3. It is thus clear that the first adhesive layer 322a may be configured according to design needs, and the present disclosure is not limited to what is shown.

Embodiment 4

Figure 4A:
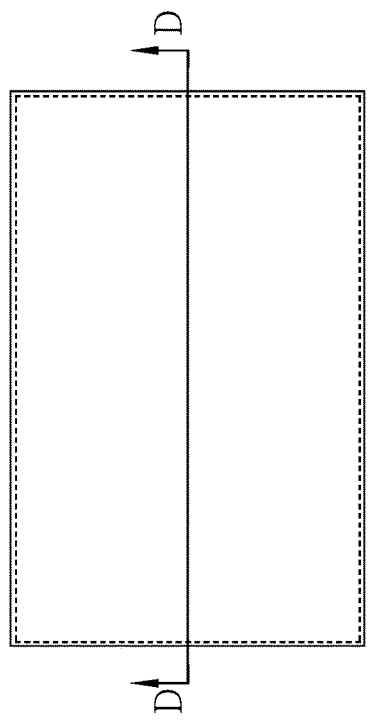
FIG. 4A is a schematic top view of a display device according to Embodiment 4 of the present disclosure.
Figure 4B:
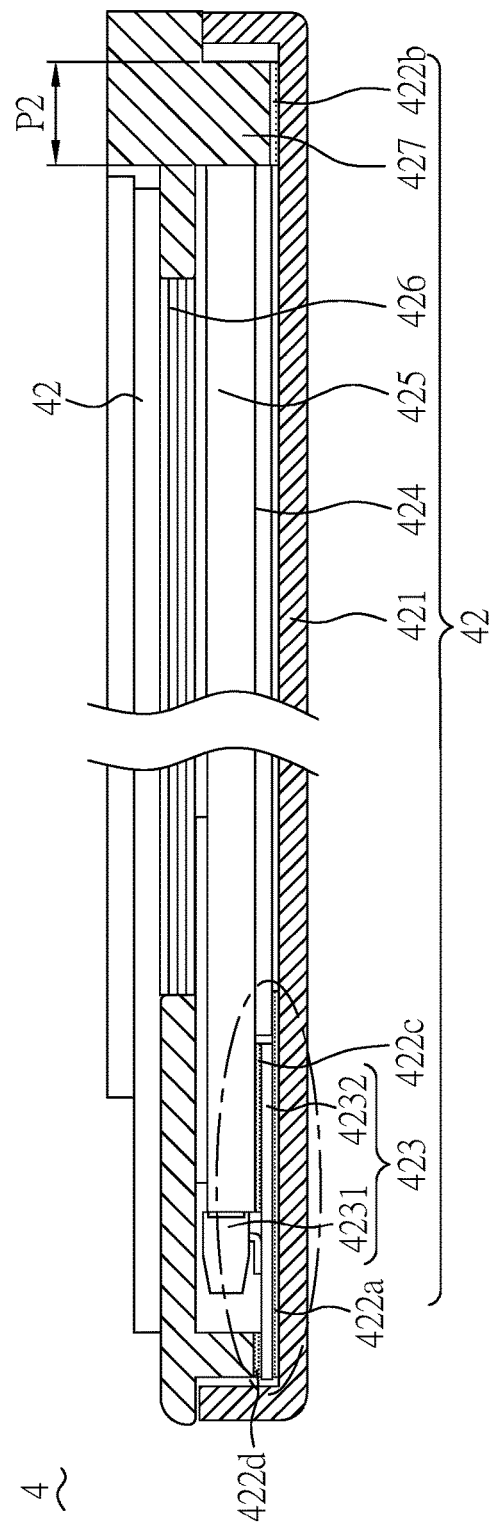
FIG. 4B is a schematic cross-sectional view of the display device taken along Line D-D of GIG. 4A.
Figure 4C:
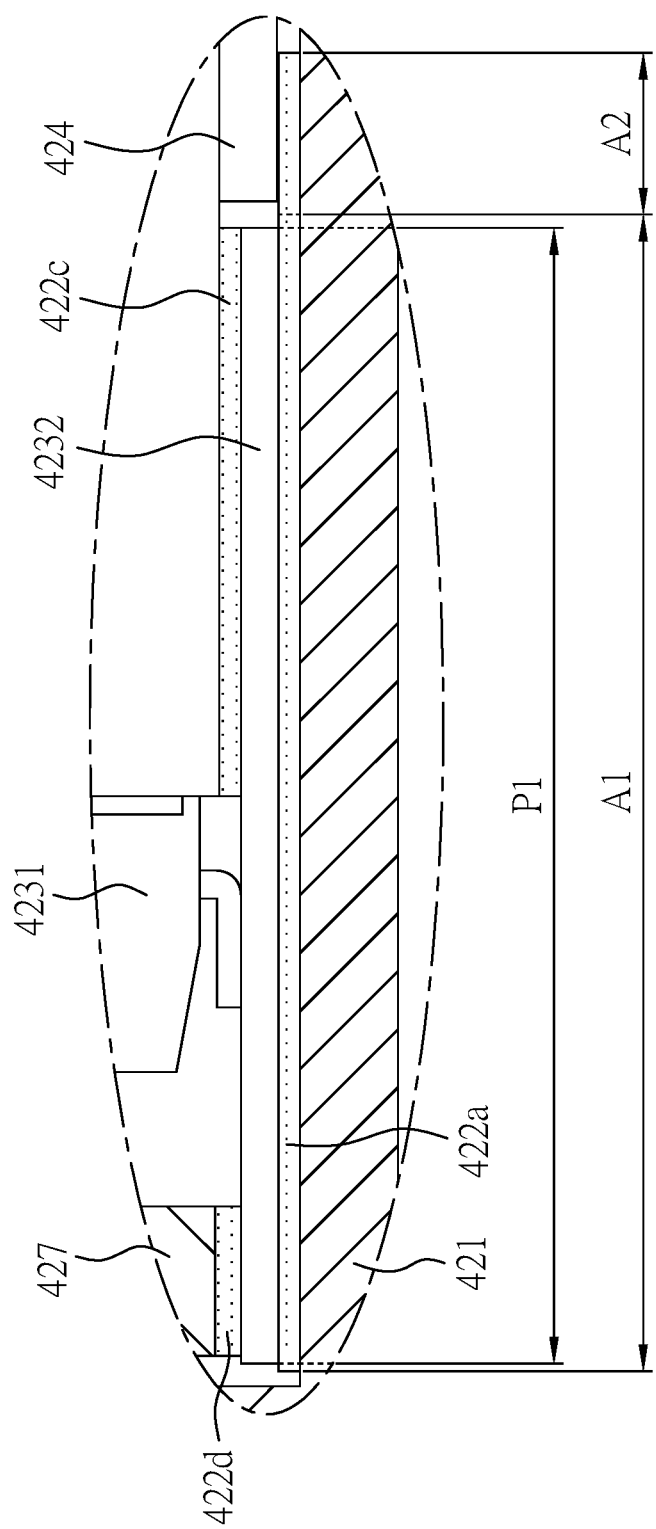
FIG. 4C is a close-up view of FIG. 4B.

Referring to FIG. 4A, FIG. 4B, and FIG. 4C, a schematic top view, a schematic cross-sectional view, and a close-up view of a display device according to Embodiment 4 of the present disclosure are shown.

In Embodiment 4 of the present disclosure, the display device 4 comprises a display panel 41 and a backlight module 42. The display panel 41 is disposed on the backlight module 42, and the backlight module 42 comprises a back plate 421, a first adhesive layer 422a, a second adhesive layer 422b, a third adhesive layer 422c, a fourth adhesive layer 422d, an light emitting module 423, a reflector 424, a light guide plate 425, an optical film set 426, and a frame 427.

The back plate 421 comprises a first peripheral zone P1 and a second peripheral zone P2. The first peripheral zone P1 and the second peripheral zone P2 are located at two opposite sides of the back plate 421, respectively. The first adhesive layer 422a is disposed on back plate 421, and comprises a first area A1 and a second area A2. The first area A1 is adjacent to the second area A2, and the first peripheral zone P1 overlaps a part of the first area A1. The second adhesive layer 422b is disposed in the second peripheral zone P2. The light emitting module 423 is disposed in the first peripheral zone P1. The light emitting module 423 comprises a light emitting unit 4231 and a print circuit board 4232. The light emitting unit 4231 and the print circuit board 4232 are electrically connected, and the print circuit board 4232 is disposed in the first area A1 of the first adhesive layer 422a. The reflector 424 is adjacent to the print circuit board 4232 of the light emitting module 423, and a part of the reflector 424 is disposed in the second area A2 of the first adhesive layer 422a. The light guide plate 425 and the optical film set 426 are successively stacked on the reflector 424. A part of the frame 427 is disposed on the second adhesive layer 422b, and the other part of the frame 427 is disposed on the fourth adhesive layer 422d.

Embodiment 4 is different from Embodiment 2 for its differently configured print circuit board 4232. In the fourth embodiment, the print circuit board 4232 extends between the back plate 421 and the frame 427, and the fourth adhesive layer 422d is disposed on the print circuit board 4232, so that the fourth adhesive layer 422d binds the frame 427 and the print circuit board 4232 together.

As shown, the fourth adhesive layer 422d may comprise one of hot melt adhesive and ultraviolet-pressure sensitive adhesive, without limitation. As the properties of hot melt adhesive and of ultraviolet-pressure sensitive adhesive have been described previously, detailed explanation is omitted herein.

Additionally, in Embodiment 4, while the first adhesive layer 422a located in the first area A1 and the second area A2 is formed continuously to bind the print circuit board 4232 with a part of the reflector 424, it may be the case of Embodiment 3, where the first adhesive layer 422a has the first area A1 and second area A2 formed separately to positionally correspond to the bind print circuit board 4232 and a part of the reflector 424, respectively (not shown).

Further description is now directed to the patterned adhesive layer in terms of configuration and material. Please refer to FIG. 5A, FIG. 5B, and FIG. 5C. FIG. 5A shows a pattern of the patterned adhesive layer of the disclosed display device. FIG. 5B is a close-up view of FIG. 5A. FIG. 5C shows another pattern of the patterned adhesive layer of the disclosed display device.

As shown in FIG. 5A and FIG. 5B, a patterned adhesive layer 52 is disposed on the back plate 51. The patterned adhesive layer 52 has its pattern extending along the inner side of the back plate 51. The patterned adhesive layer 52 comprises a first adhesive layer 52a and a second adhesive layer 52b. The first adhesive layer 52a comprises a first area A1, a second area A2, and a third area A3. The first adhesive layer 52a of the first area A1, second area A2, and the third area A3 positionally corresponds to other components on the back plate 51, and is applicable to the display device of any of Embodiments 1, 2 and 4 of the present disclosure.

In FIG. 5C, a patterned adhesive layer 54 is disposed on the back plate 53. The patterned adhesive layer 54 has its pattern extending along the inner side of the back plate 53. The patterned adhesive layer 54 comprises a first adhesive layer 54a and a second adhesive layer 54b. The first adhesive layer 54a comprises a first area A1, a second area A2, and a third area A3. The first adhesive layers 54a of the first area A1, the second area A2, and the third area A3 are separated from each other, and is applicable to the display device of Embodiment 3. It is clear that the first adhesive layer and the second adhesive layer of the present disclosure may be configured differently according to different designs.

Figure 6A:
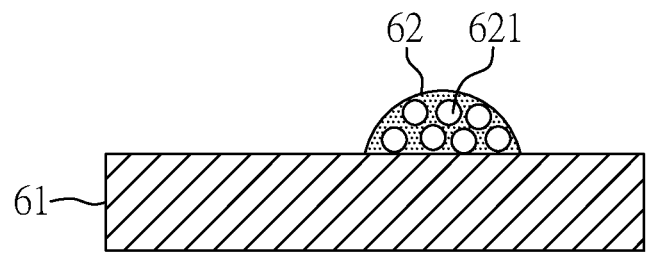
FIG. 6A shows hot melt adhesive with buffering particles on the disclosed display device.
Figure 6B:
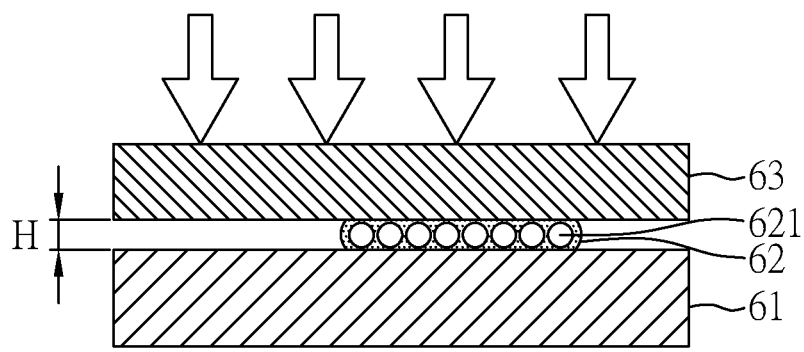
FIG. 6B shows the hot melt adhesive with buffering particles pressed on the disclosed display device.

Referring to FIG. 6A and FIG. 6B, hot melt adhesive with buffering particles used in the disclosed display device in its pre-press and post-press states is shown. As shown in FIG. 6A, a first adhesive layer 62 is disposed on a first substrate 61. The first adhesive layer 62 is hot melt adhesive that contains therein plural buffering particles 621. When the first adhesive layer 62 is made, a second substrate 63 is placed onto the first substrate 61. At this time, as shown in FIG. 6B, the first adhesive layer 62 binds the first substrate 61 and the second substrate 63 together with the buffering particles 621 holding a height H between the first substrate 61 and the second substrate 63. By designing the dimensions, shape and amount of the buffering particles 621, it is possible to adjust the height H and in turn control the height difference between the first substrate 61 and the second substrate 63 after the first adhesive layer 62 is pressed.

Figure 7:
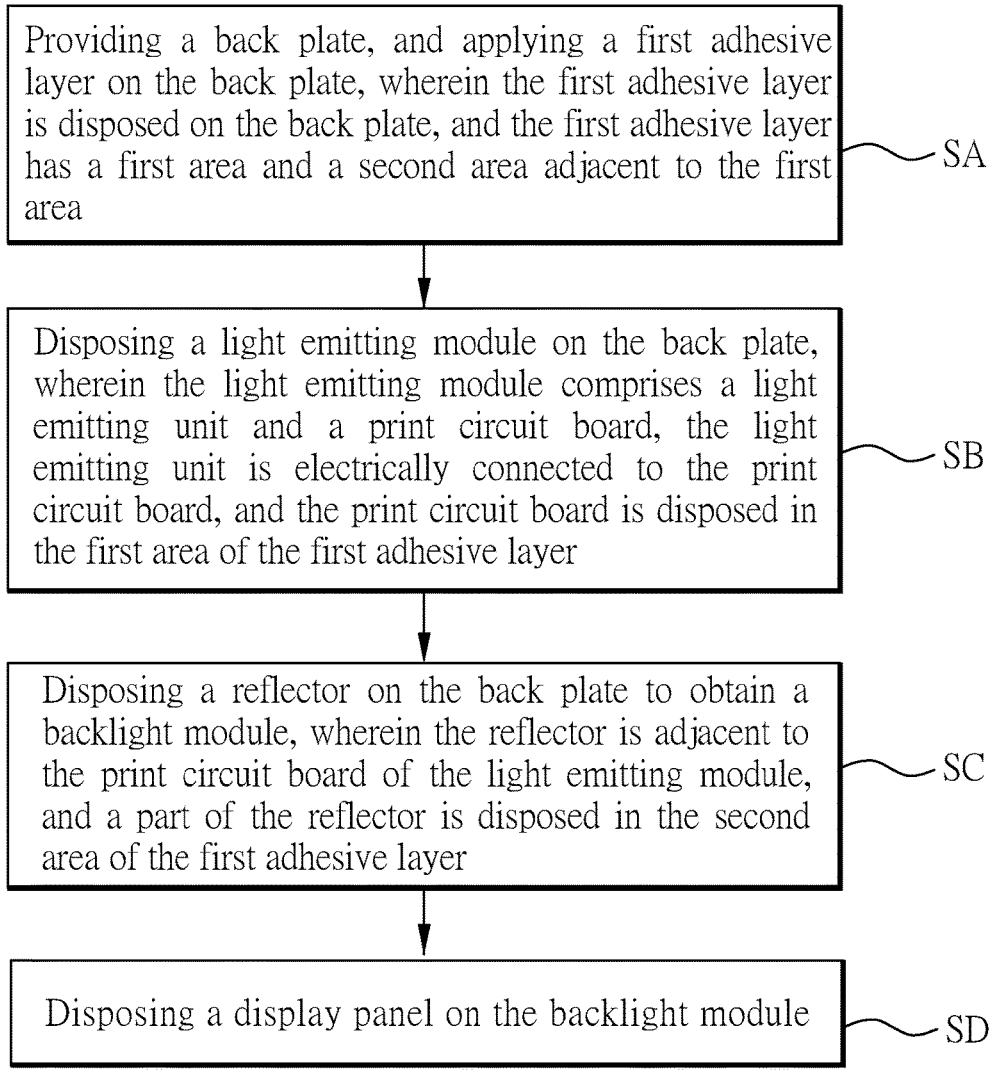
FIG. 7 is a flowchart of a preparing method of the disclosed display device.
Figure 8A:
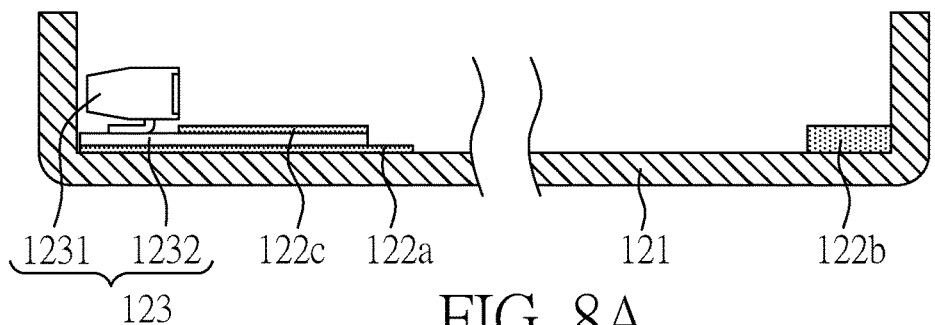
FIG. 8A through FIG. 8D illustrate processing procedures of the preparing method of the display device according to the present disclosure.
Figure 8B:
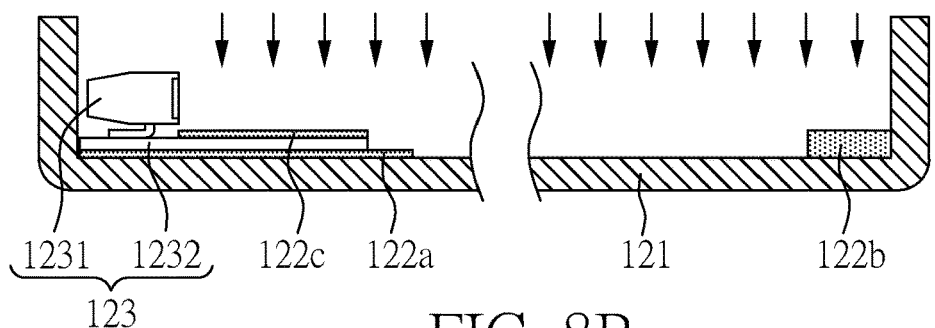
Figure 8C:
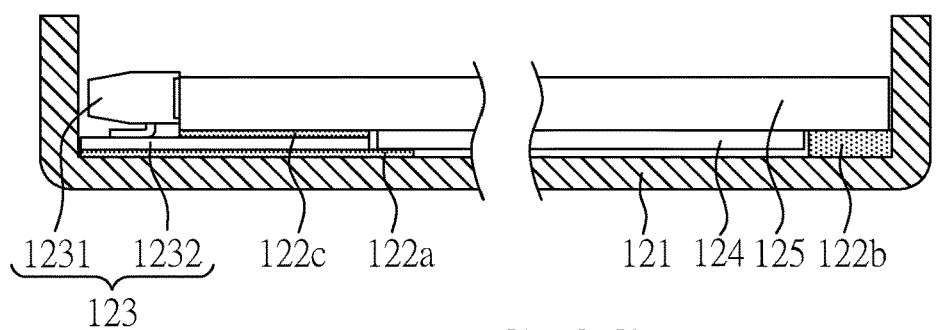
Figure 8D:
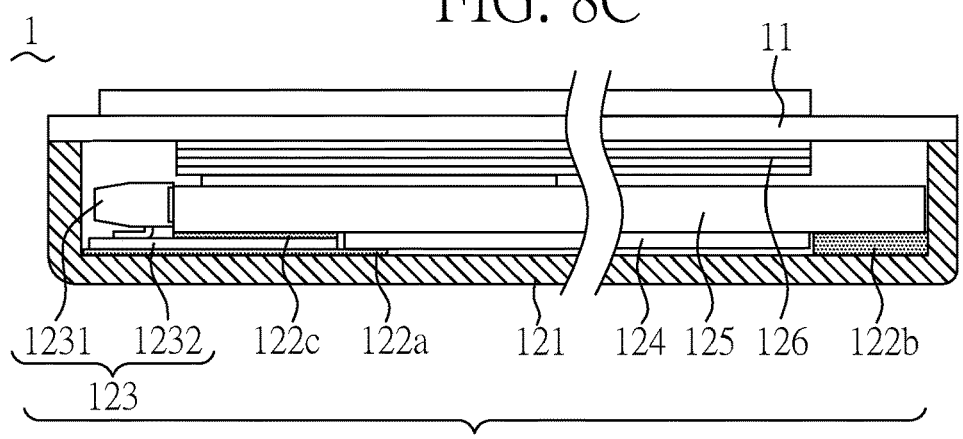

Referring to FIG. 7 and FIG. 8A through. FIG. 8D, a flowchart of a preparing method of the disclosed display device and processing procedures of the preparing method of the display device according to the present disclosure are shown. The following description also referred to FIG. 1A through FIG. 1C.

The disclosed preparing method of a display device comprises the following steps: Step SA, providing an adhesive-applying device and a back plate 121, and applying a first adhesive layer 122a on the back plate 121 using the adhesive-applying device, wherein the first adhesive layer 122a is disposed on the back plate 121, and the first adhesive layer 122a has a first area A1 and a second area A2 adjacent to the first area A1; Step SB, disposing an light emitting module 123 on the back plate 121, wherein the LED module 123 comprises a light emitting unit 1231 and a print circuit board 1232, wherein the light emitting unit 1231 is electrically connected to the print circuit board 1232, and the print circuit board 1232 is disposed in the first area A1 of the first adhesive layer 122a (as shown in FIG. 8A); Step SB1, radiating the back plate 121 with ultraviolet light (as shown in FIG. 8B); Step SC, disposing a reflector 124 on the back plate 121 to obtain a backlight module 12, wherein the reflector 124 is adjacent to the print circuit board 1232 of the light emitting module 123, and a part of the reflector 124 is disposed in the second area A2 of the first adhesive layer 122a (as shown in FIG. 8C); and Step SD, disposing a display panel 11 on the backlight module 12, so as to obtain the display device 1 (as shown in FIG. 8D).

It is to be noted that, in the disclosed preparing method, Step SB1 is optional. When the first adhesive layer 122a and the second adhesive layer 122b comprise hot melt adhesive, there is no need to subject them to ultraviolet. In this case, Step SB1 is omitted. When at least one of the patterned adhesive layer 122a and the first adhesive layer 122b comprises ultraviolet-pressure sensitive adhesive, Step SB1 is necessary so that ultraviolet cures the ultraviolet-pressure sensitive adhesive prior to the press and binding procedure.

It is clear from the above that the disclosed display device and the preparing method thereof use the first adhesive layer and the second adhesive layer that in the form of liquid glue to better align and bind the back plate of the backlight module to other components on the back plate. In addition, the third adhesive layer and fourth adhesive layer that bind components have their widths more favorable to the requirements for narrow bezels than adhesive tape is, thus being favorable to automated production of the backlight module.

Additionally, in the present disclosure, the light emitting module 123,223,323,423 can be LED module, CCFL module, OLED module or other kinds of light emitting module.

The present disclosure has been described with reference to the embodiments and it is understood that the embodiments are not intended to limit the scope of the present disclosure. Moreover, as the contents disclosed herein should be readily understood and can be implemented by a person skilled in the art, all equivalent changes or modifications which do not depart from the concept of the present disclosure should be encompassed by the appended claims.

What is claimed is:

1. A display device, comprising:
   a display panel;
   a backlight module disposed adjacent to the display panel, and the backlight module comprising:
   a back plate;
   a first adhesive layer disposed on the back plate, and the first adhesive layer having a first area and a second area adjacent to the first area;
   an light emitting module disposed on the first adhesive layer, wherein the light emitting module comprises a light emitting unit and a print circuit board, the light emitting unit is electrically connected to the print circuit board, and the print circuit board is disposed in the first area of the first adhesive layer; and
   a reflector disposed adjacent to the print circuit board of the light emitting module, wherein a part of the reflector is disposed in the second area of the first adhesive layer.

2. The display device of claim 1, wherein the backlight module comprises a light guide plate disposed on the reflector, and the back plate comprises a first peripheral zone, wherein the first peripheral zone overlaps a part of the first area.

3. The display device of claim 2, wherein the reflector comprises a first side away from the first peripheral zone, and the light guide plate comprises a protruding part that juts out of the first side of the reflector.

4. The display device of claim 3, wherein the backlight module further comprises a second adhesive layer, the second adhesive layer is located between the protruding part of the light guide plate and the back plate.

5. The display device of claim 3, wherein the light guide plate further comprises a second side away from the first peripheral zone, and in a cross-sectional view, a gap between the first side and the second side is greater than or equal to 0.1 mm and less than or equal to 0.5 mm.

6. The display device of claim 1, wherein the backlight module further comprises a frame and a third adhesive layer, and the back plate further comprises a first peripheral zone and a second peripheral zone, wherein the first peripheral zone overlaps a part of the first area, the first peripheral zone and the second peripheral zone are located at two opposite sides of the back plate, respectively, the third adhesive layer is disposed in the second peripheral zone, the third adhesive layer is disposed between the back plate and the frame, and a part of the reflector is disposed in the second area of the first adhesive layer.

7. The display device of claim 1, wherein the backlight module further comprises a frame, and the first adhesive layer further comprises a third area, wherein the first area is located between the second area and the third area, and a part of the frame is disposed in the third area of the first adhesive layer.

8. The display device of claim 1, wherein the backlight module further comprises a light guide plate and a third adhesive layer, the light guide plate is disposed on the reflector, and the third adhesive layer is located between the print circuit board and the light guide plate.

9. The display device of claim 1, wherein the backlight module further comprises a frame and a fourth adhesive layer, wherein the fourth adhesive layer is disposed between the print circuit board and the frame.

10. The display device of claim 1, wherein the first adhesive layer comprises hot melt adhesive or ultraviolet-pressure sensitive adhesive.

11. A method of preparing a display device, comprising steps of:
 (A) providing a back plate, and applying a first adhesive layer on the back plate, wherein the first adhesive layer is disposed on the back plate, and the first adhesive layer has a first area and a second area adjacent to the first area;
 (B) disposing an light emitting module on the back plate, wherein the light emitting module comprises a light emitting unit and a print circuit board, the light emitting unit is electrically connected to the print circuit board, and the print circuit board is disposed in the first area of the first adhesive layer;
 (C) disposing a reflector on the back plate to obtain a backlight module, wherein the reflector is adjacent to the print circuit board of the light emitting module, and a part of the reflector is disposed in the second area of the first adhesive layer; and
 (D) disposing a display panel on the backlight module.

12. The method of claim 11, further comprising step (B1) radiating the back plate with ultraviolet light after step (B).

13. The method of claim 11, wherein the backlight module further comprises a frame and a second adhesive layer, and the back plate further comprises a first peripheral zone and a second peripheral zone, wherein the first peripheral zone overlaps a part of the first area, the first peripheral zone and the second peripheral zone are located at two opposite sides of the back plate, respectively, the second adhesive layer is disposed in the second peripheral zone, and a part of the frame is disposed on the second adhesive layer.

14. The method of claim 11, wherein the backlight module further comprises a frame, and the first adhesive layer further comprises a third area, wherein the first area is located between the second area and the third area, and a part of the frame is disposed in the third area of the first adhesive layer.

15. The method of claim 11, wherein the backlight module further comprises a light guide plate and a third adhesive layer, the light guide plate is disposed on the reflector, and the third adhesive layer is located between the print circuit board and the light guide plate.

16. The method of claim 11, wherein the first adhesive layer comprises hot melt adhesive or ultraviolet-pressure sensitive adhesive.

\* \* \* \* \*